(12) United States Patent
Nakanishi et al.

(10) Patent No.: US 6,634,218 B1
(45) Date of Patent: Oct. 21, 2003

(54) ENGINE TESTING APPARATUS (75) Inventors: Hideki Nakanishi, Miyanohigashi-machi (JP); Shinji Noguchi, Miyanohigashi-machi (JP); Yasuhiro Ogawa, Miyanohigashi-machi (JP)

(73) Assignee: Horiba, LTD, Miyanohigashi-Machi (JP)

( * ) Notice: Subject to any disclaimer, the term of this patent is extended or adjusted under 35 U.S.C. 154(b) by 0 days.

(21) Appl. No.: 09/559,149

(22) Filed: Apr. 26, 2000

(30) Foreign Application Priority Data

| Apr. 28, 1999 | (JP) | ............................................ | 11-122675 |
| Apr. 30, 1999 | (JP) | ............................................ | 11-123864 |
| Apr. 30, 1999 | (JP) | ............................................ | 11-123882 |

(51) Int. Cl.⁷ ................................................ G01L 3/26
(52) U.S. Cl. ............................................ 73/116; 73/117
(58) Field of Search .......................... 73/116, 862, 117, 73/118.1

(56) References Cited

U.S. PATENT DOCUMENTS 4,466,294 A    8/1984   Bennington et al.
4,939,985 A    7/1990   Von Thun
5,435,192 A    7/1995   Eagan et al.

FOREIGN PATENT DOCUMENTS

JP          2000234983   *  2/1999   .......... G01M/15/00

* cited by examiner

*Primary Examiner*—Hezron Williams
*Assistant Examiner*—Maurice Stevens
(74) *Attorney, Agent, or Firm*—Oppenheimer Wolff & Donnelly (57) ABSTRACT

The present invention provides an engine testing apparatus capable of accurately conducting a simulation of a vehicle and includes a dynamometer connected to an output section of an engine under test, a dynamo controller for controlling rotation of the dynamometer, and an actuator for controlling a throttle opening degree of the engine. The dynamo controller and the actuator are controlled to adjust an output of the engine under test, wherein a constant speed driving slip ratio ($S_a$) in a constant speed running state in a target vehicle speed pattern, an acceleration driving slip ratio ($S_b$) in an acceleration running state, and a deceleration driving slip ratio ($S_c$) in a deceleration running state are previously computed as data for correcting tire slippage of the actual running vehicle.

10 Claims, 10 Drawing Sheets

ENGINE TESTING APPARATUS

FIELD OF THE INVENTION

The present invention relates to an engine testing apparatus.

DESCRIPTION OF THE PRIOR ART

As an apparatus for checking performance of an automobile engine, there exists an engine testing apparatus comprising a dynamometer connected to an output section of an engine under test, a dynamo controller for controlling the dynamometer, and an actuator for controlling a throttle opening degree of the engine under test. The engine testing apparatus controls the dynamo controller and the actuator to adjust the output of the engine under test.

Figure 3:
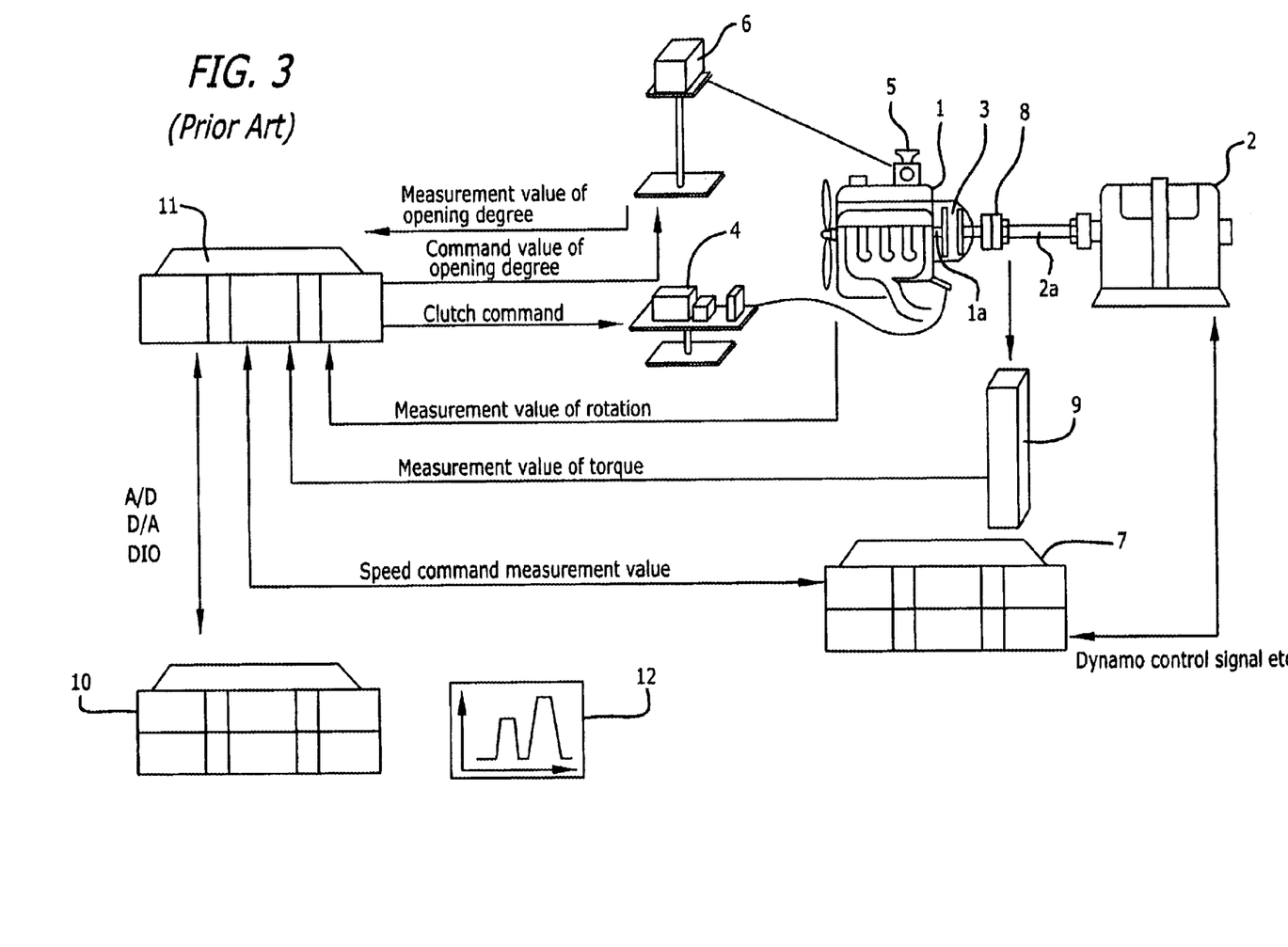
FIG. 3 schematically shows the entire structure of the engine testing apparatus of the first, second and third inventions.

FIG. 3 schematically shows a general structure of the engine testing apparatus. In FIG. 3, reference numeral 1 represents an engine under test and reference numeral 2 represents a dynamometer. An output shaft 1a of the engine 1 and a driving shaft 2a of the dynamometer 2 are coupled to each other through a clutch 3 such that the shafts 1a and 2a can be connected to and disconnected from each other. Reference numeral 4 represents a clutch actuator for driving the clutch 3. Reference numeral 5 represents a throttle of the engine 1 under test, and the throttle 5 is driven by a throttle actuator 6 and its throttle opening degree is controlled. Reference numeral 7 represents a dynamo controller for controlling the dynamometer 2. Reference numeral 8 represents a torque sensor mounted to the driving shaft 2a of the dynamometer 2, and reference numeral 9 represents a torque amplifier for appropriately amplifying the output of the torque sensor 8.

Figure 2:
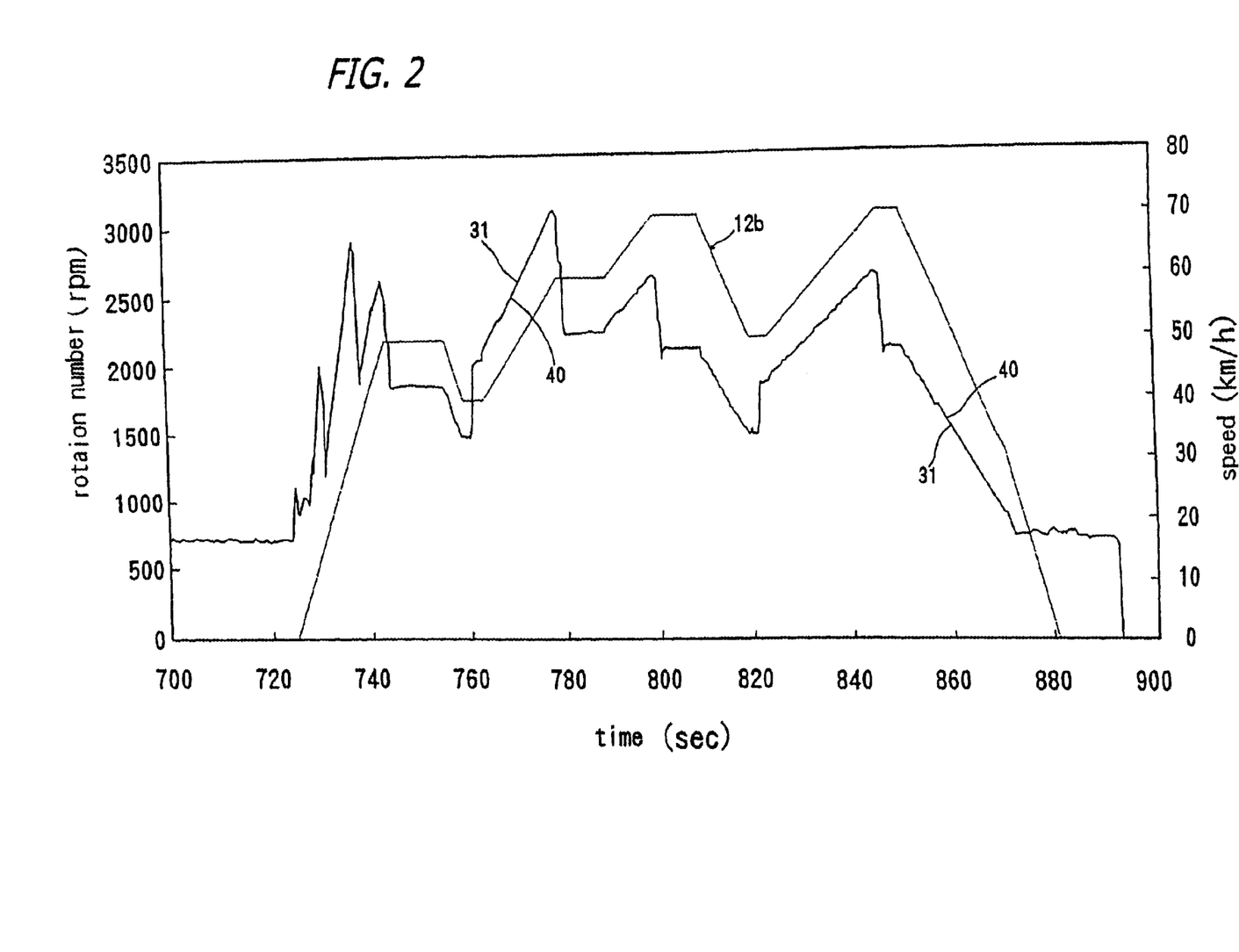
FIG. 2 shows in comparing manner, an engine rotation pattern converted from a target vehicle speed pattern in a simulation carried out by the engine testing apparatus of the first and third inventions and an engine rotation pattern measured when an actual vehicle is allowed to run on a chassis dynamo.
Figure 6:
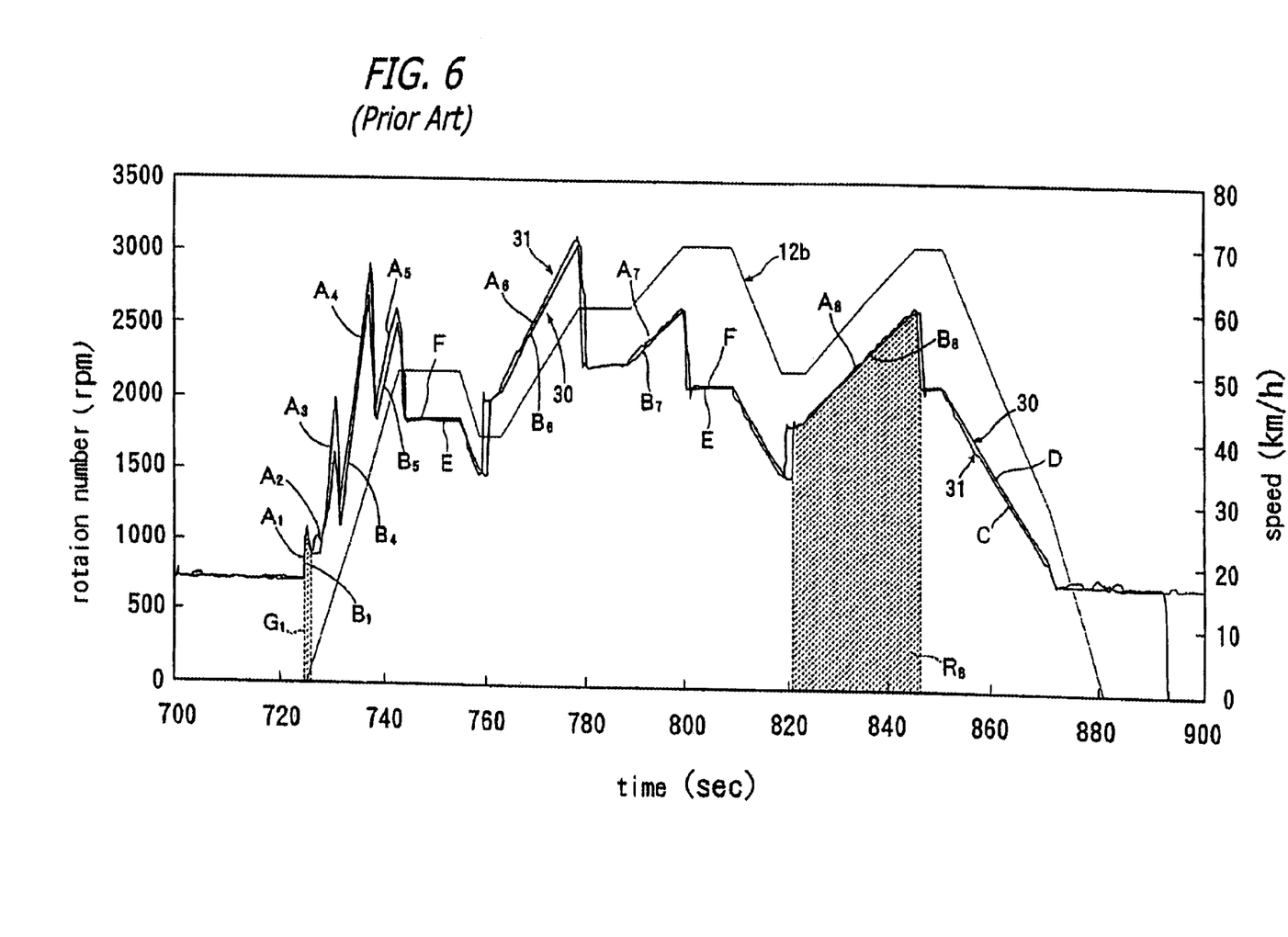
FIG. 6 shows in comparing manner, an engine rotation pattern converted from a target vehicle speed pattern in a simulation carried out by the conventional engine testing apparatus and an engine rotation pattern measured when an actual vehicle is allowed to run on a chassis dynamo.

Reference numeral 10 represents a control computer as a simulator for controlling the entire apparatus, and reference numeral 11 represents a signal conditioner unit. The computer 10 performs a computation based on an input from an input apparatus (not shown) and based on signals from various sensors such as the torque sensor 8 provided in the apparatus, and outputs commands to various portions of the apparatus. For example, a target vehicle speed pattern 12 shown in FIG. 3, a target vehicle speed pattern 12a shown in FIG. 4(A) or a target vehicle speed pattern 12b shown in FIGS. 2 and 6 are inputted to the computer 10. That is, in each of the target vehicle speed patterns 12, 12a and 12b, the horizontal axis shows time (second) and vertical axis shows speed (km/h), and these patterns are target running patterns of desired driving.

The signal conditioner unit 11 is an interface having an AD converting function and a DA converting function. The AD converting function of the signal conditioner unit 11 converts signals from various sensors such as a torque sensor 8. The DA converting function converts commands from the computer 10, and output commands to various portion of the apparatus such as the dynamo controller 7, the clutch actuator 4 and the throttle actuator 6.

Figure 5:
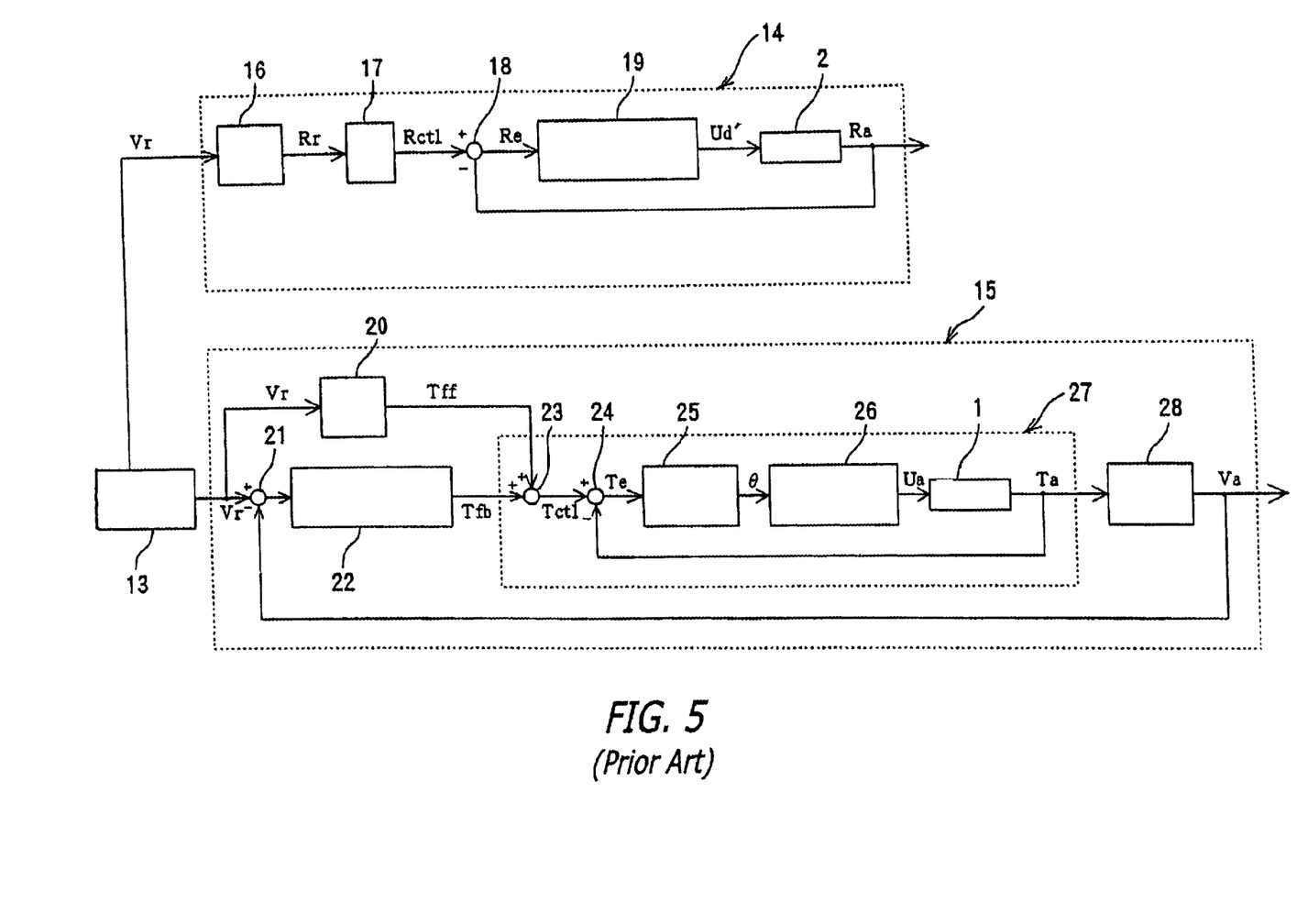
FIG. 5 shows a control flow in a conventional engine testing apparatus.
Figure 9:
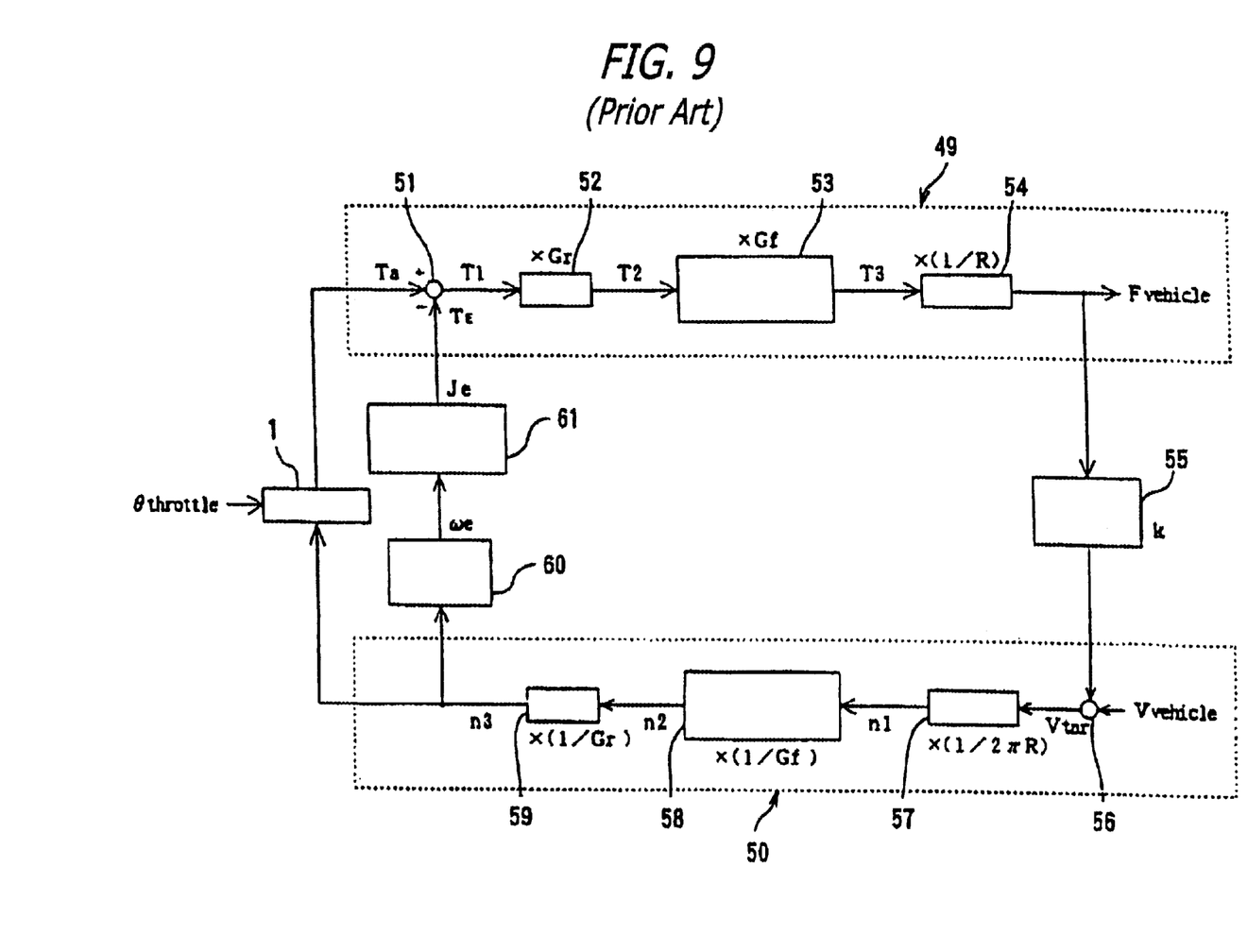
FIG. 9 shows a computation flow in the conventional engine testing apparatus.

In a conventional engine testing apparatus, as shown in FIGS. 5 and 9, the moment of inertia of the engine is used to compute the load of rotating objects of an actual vehicle, i.e., an engine, a transmission, a differential gear and tire. This is because the moment of inertia of the engine is greater than moments of other rotating objects.

FIGS. 5 and 9 respectively show a conventional control flow and computation flow for the above-described engine testing apparatus. First, the control flow is described. In FIG. 5, reference numeral 13 represents a target pattern generator. The target pattern generator 13, which is provided in the computer 10, outputs a target speed signal V, to allow the engine 1 under test to run in a predetermined running pattern based on the target vehicle speed patterns 12, 12a and 12b which have been inputted into the computer 10. The target speed signal V, is inputted to a rotation control system 14 and a simulation vehicle control system 15.

The rotation control system 14 and the simulation vehicle control system 15 are constituted in the following manner. First, the rotation control system 14 comprises a rotation generator 16 to which the target speed signal V, is inputted, a delay correcting circuit 17, a butt portion 18, a rotation feedback controller 19 and the dynamometer 2. When the target speed signal $V_r$ is inputted to the rotation generator 16, an engine target rotation number signal [a target value of the dynamometer rotation number (the rotation number, hereinafter)] $R_r$ is outputted from the rotation generator 16 based on the target speed signal $V_r$.

Figure 4:
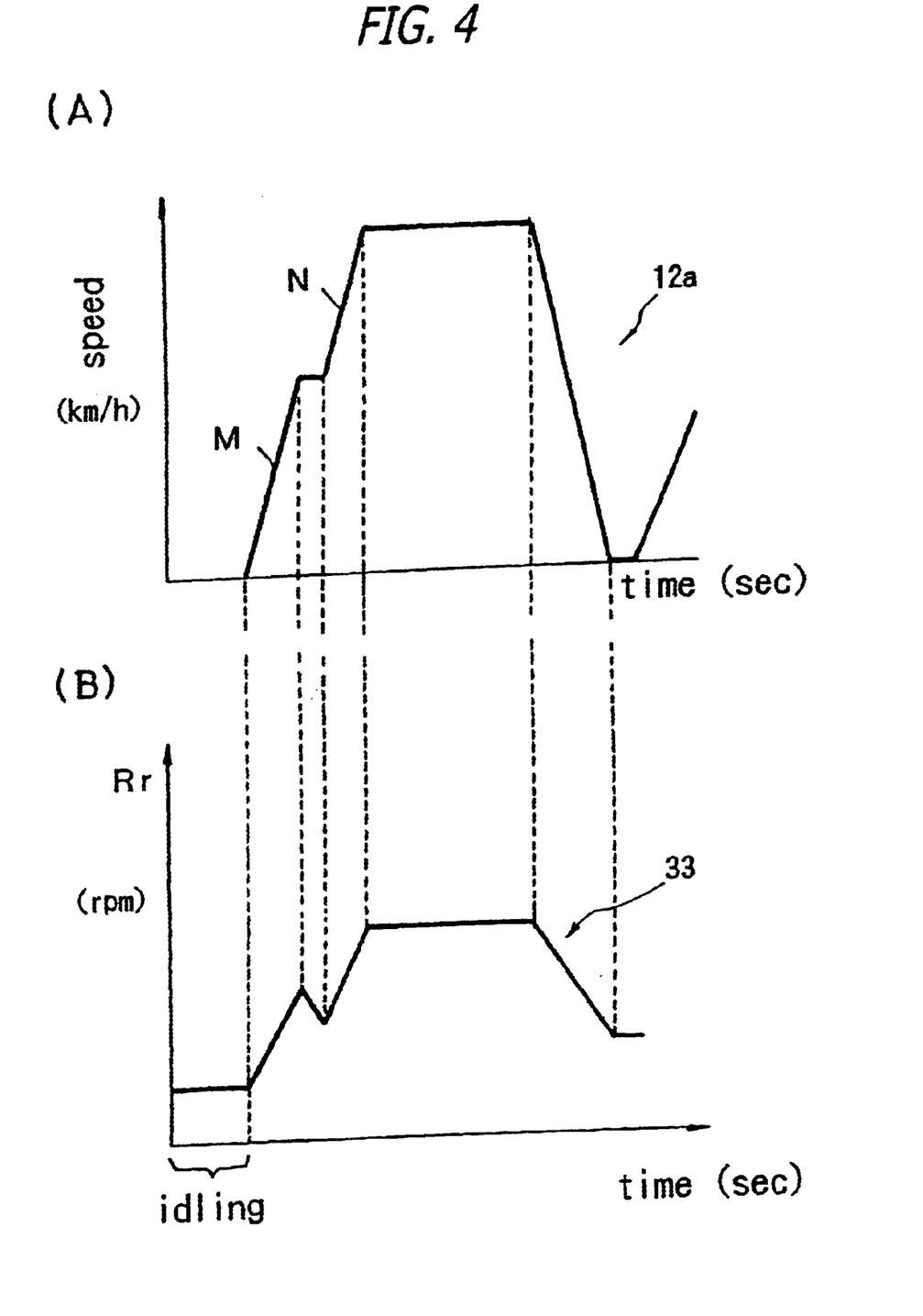
FIG. 4(A) shows one example of the target vehicle speed pattern.
FIG. 4(B) shows one example of the rotation target pattern.

For example, as shown in FIG. 4(B), a target rotation number signal $R_r$ which is converted from the target vehicle speed pattern 12a shown in FIG. 4(A) is obtained in simulation. That is, an engine rotation pattern 33 is obtained. Similarly, when the target vehicle pattern 12b, is employed, an engine rotation pattern 30, which is converted from the target vehicle speed pattern 12b is obtained as shown in FIG. 6. When the pattern is converted from target vehicle speed pattern 12a to the engine rotation pattern 33 or from the target vehicle speed pattern 12b to the engine rotation pattern 30, a diameter of a tire, a final-drive ratio and a gear ratio in accordance the type of vehicle are taken into consideration.

Referring back to FIG. 5, the target rotation number signal $R_r$ becomes a control target rotation number signal $R_{ctl}$ through the delay correcting circuit 17, and is outputted to the butt point 18. Since an actual rotation number signal $R_a$ of the dynamometer 2 has been inputted to the butt point 18, a deviation Re between the control target rotation number signal $R_{ctl}$ and an actual rotation number signal $R_a$ is PI-controlled, for example, by the rotation feedback controller 19, thereby setting an operation amount signal Ud'. The operation amount signal Ud' is sent to the dynamometer 2.

In FIG. 5, the simulation vehicle control system 15 includes a torque generator 20 to which the target speed signal $V_r$ is inputted and further includes a butt point 21 to which the target speed $V_r$ is inputted and a speed feedback controller 22 are connected in parallel to a rear stage of the target pattern generator 13 which outputs the target speed signal $V_r$. A torque control system 27, which comprises an adding point 23, a butt point 24, a throttle map 25, a throttle opening degree controller 26 and the engine 1 under test, is provided in the rear stage of the torque generator 20 and the speed feedback controller 22. A simulation vehicle model 28 is provided in the rear stage of the torque control system 27. The throttle map 25 is a map for determining a target throttle opening degree to control the engine. The simulation vehicle model 28 is a model for calculating a driving force of the vehicle using the engine output torque to convert the calculated value into a speed signal using the driving force.

In the simulation vehicle control system 15, if the target speed $V_r$ is inputted to the torque generator 20, a feedforward torque $T_{ff}$, which is an output torque required for the engine from the torque generator 20, is outputted to the adding point 23. In this case, when the target vehicle speed pattern 12 or the target vehicle speed patterns 12a and 12b is converted into the feedforward torque $T_{ff}$, a vehicle inertia weight and running resistance in accordance with the type of vehicle are taken into consideration.

The target speed signal $V_r$ is butted against an actual speed signal $V_a$ outputted from the simulation vehicle model 28 at the butt point 21. A deviation there between is sent to the speed feedback controller 22, and it is outputted to the adding point 23 as a feedback torque $T_{fb}$. The feedforward torque $T_{ff}$ and the feedback torque $T_{fb}$ are added in the adding point 23, and the target control torque signal $T_{ctl}$ is obtained. The target control torque signal $T_{ctl}$ is butted against an actual output torque valve $T_a$ of the engine 1 under test, a deviation $T_e$ thereof is inputted to the throttle map 25. An operation target throttle opening degree θ is obtained. The operation target throttle opening degree θ is input to the throttle opening degree controller 26, an operation amount $U_a$ is set, and the operation amount signal $U_a$ is sent to the engine under test 1.

Next, the computation flow is explained. In FIG. 9, reference numerals 49 and 50 respectively represent a torque computation system and a rotation computation system. The torque computation system 49 comprises a butt point 51 for butting the output torque value $T_a$ of the engine 1 under test and a torque value $T_E$ resulting from an engine inertia moment $J_e$ against each other, a multiplier 52 for multiplying the output T1 of the butt point 51 by a gear charge ratio $G_r$, and for outputting a torque value T2 after gear change, a multiplier 53 for multiplying the torque value T2 after gear change by a differential gear ratio $G_f$ and for outputting a torque value T3 through the differential gear, and a multiplier 54 for multiplying the torque value T3 through the differential gear by reciprocal 1/R of a tire diameter R and outputting a driving force $F_{vehicle}$ of a tire surface.

The rotation computation system 50 comprises a multiplier 56 for multiplying a target vehicle speed $V_{vehicle}$ by a tire slip ratio k from a calculator 55, which obtains the tire slip ratio k, and for outputting the target vehicle speed $V_{tar}$ after correction of slip ratio, a multiplier 57 for multiplying the target vehicle speed $V_{tar}$ by a multiplier (1/2πR) concerning the tire diameter and for outputting a rotation angle speed $n_1$ of the tire, a multiplier 58 for multiplying the rotation angle speed $n_1$ of the tire by a multiplier (1/$G_f$) concerning the gear ratio and for obtaining a rotation angle speed $n_2$ closer to an entrance of the differential gear (closer to the engine), and a multiplier 59 for multiplying the rotation angle speed $n_2$ closer to the entrance of the differential gear by a multiplier (1/$G_r$) concerning the gear change ratio and for obtaining an engine rotation angle speed $n_3$ (corresponding to the $V_r$).

Reference numeral 60 represents a differentiator for differentiating the engine rotation angle speed $n_3$ and for outputting an engine rotation acceleration $\omega_e$ and reference numeral 61 represents a multiplier for multiplying the engine rotation acceleration $\omega_e$ by an engine inertia moment $J_e$ and for outputting a torque value $T_e$ caused by engine inertia. The torque value $T_e$ caused by engine inertia is outputted to a butt point 51 of the torque computation system 49.

In the above-described conventional engine testing apparatus, a single transmission efficiency constant, which concerns a transmission of engine output to a road surface and a driving force which accelerates the vehicle, is utilized. That is the transmission efficiency constant matches the rotation number of a roller for 2-shaft chassis dynamo with the rotation number of an actual vehicle where constant speed (normal) driving is presumed.

However, tire slippage occurs on the road surface under actual operating conditions (actual running vehicle in actual case). That is, in the conventional engine testing apparatus, as markedly shown in the 2-shaft chassis dynamo, it is impossible to reproduce the change of the slip ratio between the tire and the roller related to the difference in the tire deformation degree of the tire at the time of constant speed running, acceleration running and deceleration running.

To sum up, slip is not simulated in the conventional engine testing apparatus shown in FIG. 6. For simulation conducted by the conventional testing apparatus, a difference is generated between the engine rotation pattern 30 converted from the target vehicle speed pattern 12b and the engine rotation pattern 31 measured when the actual vehicle runs on a chassis dynamo. It can be found from FIG. 6 that the engine rotation pattern 30 is shifted lower than the engine rotation pattern 31 at the time of acceleration and shifted higher than the engine rotation pattern 31 at the time of deceleration.

In order to reproduce the engine rotation of the actual vehicle running, it is necessary to consider the slippage between the tire and road surface in addition to the tire diameter, the final-drive ratio, the gear ratio and the vehicle inertia weight. However, in the case of the conventional engine testing apparatus, this point is lacking and therefore, an accurate simulation can not be conducted.

A first invention has been accomplished in view of the above circumstances, and an object of the first invention is to provide an engine testing apparatus capable of accurately conducting a simulation of a vehicle.

In the above-described conventional engine testing apparatus, as shown in FIGS. 5 and 9, the rotational acceleration of the engine 1 under test obtained in the rotation computation system 50 is multiplied by an inertia moment of the engine 1 under test, and the result is used in the torque computation in the torque computation system 49 to calculate a load. That is, the simulation is conducted such that at the time of acceleration, the output torque $T_E$ corresponding to the inertia of the engine 1 under test is absorbed by the dynamometer 2, and at the time of deceleration, the torque is increased on the contrary.

However, in the actual vehicle running in the actual case, inertia of other rotating bodies such as the transmission, a differential gear and a tire exert an influence upon the load, and in the case of the conventional engine testing apparatus, this consideration is lacking and thus, an accurate simulation can not be conducted.

A second invention has been accomplished in view of the above-described circumstances, and an object of the second invention is provide an engine testing apparatus capable of accurately conducting a simulation of a vehicle.

Since a rotational driving force of the engine through the transmission and differential gear is transmitted to the tire at a ratio of 1:1, it is conceivable that controlling the actual rotation number $R_a$ of the dynamometer 2 is the same as controlling the rotation number of the engine in effect. From this point of view, in the engine testing apparatus, it is necessary to reproduce the rotation number of the engine in the actual running vehicle.

However, in the actual running vehicle in the actual case, tire slippage occurs on the road surface. The conventional engine testing apparatus does not take this slippage into consideration, i.e., tire slippage is not simulated. Thus, as shown in FIG. 6, in a simulation carried out in the conventional engine testing apparatus, a difference is generated between the engine rotation pattern 30 converted from the target vehicle speed pattern 12b and the engine rotation pattern 31 measured when the actual vehicle runs on a chassis dynamo. It can be found from FIG. 6 that the engine rotation pattern 30 is shifted lower than the engine rotation pattern 31 at the time of acceleration and shifted higher than the engine rotation pattern 31 at the time of deceleration.

To sum up, in order to reproduce the engine rotation of the actual running vehicle, it is necessary to take into consideration tire slippage between the tire and road surface in addition to the tire diameter, the final-drive ratio, the gear ratio, the vehicle inertia weight and the running resistance. However, in the case of the conventional engine testing apparatus, this point is lacking and therefore, an accurate simulation can not be conducted.

A third invention has been accomplished in view of the above circumstances, and an object of the third invention is to provide an engine testing apparatus capable of accurately conducting a simulation of a vehicle.

SUMMARY OF THE INVENTION

To achieve the above object, according to the first invention, there is provided an engine testing apparatus comprising a dynamometer connected to an output section of an engine under test for simulating an actual vehicle running on a chassis dynamo, a dynamo controller for controlling rotation of the dynamometer, and an actuator for controlling a throttle opening degree of the engine under test. The dynamo controller and the actuator are controlled to adjust an output of the engine under test, wherein a constant speed driving slip ratio ($S_a$) in a constant speed running state for a target vehicle speed pattern, an acceleration driving slip ratio ($S_b$) in an acceleration running state, and a deceleration driving slip ratio ($S_c$) in a deceleration running state are previously computed and stored as data for correcting tire slippage during the actual vehicle running. An engine target rotation number ($R_r$), which is obtained by converting the target vehicle speed pattern by values of the driving slip ratios ($S_a$), ($S_b$) and ($S_c$), is corrected for each of the running states. A new engine target rotation number obtained by this correction is used at the time of simulation, thereby controlling the rotation of the dynamometer.

According to another aspect of the first invention, there is provided an engine testing apparatus comprising a dynamometer connected to an output section of an engine under test to simulate an actual vehicle running on a chassis dynamo, a dynamo controller for controlling rotation of the dynamometer, and an actuator for controlling a throttle opening degree of the engine under test. The dynamo controller and the actuator are controlled to adjust an output of the engine under test, wherein a constant speed driving slip ratio ($S_a$) in a constant speed running state in a target vehicle speed pattern, an acceleration driving slip ratio ($S_b$) in an acceleration running state, and a deceleration driving slip ratio ($S_c$) in a deceleration running state are previously computed and stored as data for correcting tire slippage of the actual running vehicle. In each of the running states, the rotation number ($R_{ta}$) {[$R_{ta}=R_r\times(1+S_a)$], ($R_{tb}$) [$R_{tb}=R_r\times(1+S_b)$]} or ($R_{tc}$) [$R_{tc}=R_r\times(1+S_c)$]}, which is obtained by adding to the engine target rotation number ($R_r$) a term obtained by multiplying the engine target rotation number ($R_r$) by the constant speed driving slip ratio ($S_a$), the acceleration driving slip ratio ($S_b$) or the deceleration driving slip ratio ($S_c$) is determined as a new rotation number subjected to a tire slip correction, and are used at the time of simulation, thereby controlling the rotation of the dynamometer.

The engine rotation pattern, which is obtained by converting from the target vehicle speed pattern in the conventional simulation, is shifted lower and higher than the engine rotation pattern of an actual vehicle running on a chassis dynamo. The present inventors have contemplated that this observation may be related to tire slippage. From this view point, a concept of introducing the driving slip ratio S was developed. The present inventors defined the driving slip ratio S using the average value of ratio between the engine rotation number shown by the engine rotation pattern and the engine rotation number shown by the engine rotation pattern. Further, since the engine rotation patterns are obtained from, for example, the target vehicle speed patterns including a constant speed (normal) section, an acceleration section and a deceleration section, each of states of constant speed, acceleration and deceleration can not be covered with one driving slip ratio S. From this point of view, the present inventors divided the driving slip ratio S into three kinds, i.e., constant speed, acceleration and deceleration, and respective slip ratios $S_a$, $S_b$ and $S_{ca}$ were calculated.

The acceleration driving slip ratio $S_b$ can be obtained in the following manner.

(1) Areas under acceleration curves $A_1$ to $A_8$ of the engine rotation pattern are obtained. For example, the area under the acceleration curve $A_1$ is $G_1$). These areas $G_1$ to $G_8$ are added. That is, $G_1+ \ldots +G_8$ is determined as G.

(2) Areas under acceleration curves $B_1$ to $B_8$ in the engine rotation pattern are obtained. For example, the area under the acceleration curve $B_1$ is $R_8$ (shaded portion). These areas $R_1$ to $R_8$ are added. That is, $R_1+ \ldots +R_8$ is determined as R.

Similar computations are conducted for all the deceleration curves C in the engine rotation pattern and all the deceleration curves D in the engine rotation pattern, thereby obtaining the slip ratio $S_c$.

The constant speed slip ratio $S_a$ can be obtained by carrying out similar computations.

After the data is obtained to correct for tire slippage of an actual vehicle, the present inventors added, to the engine target rotation number ($R_r$), a term obtained by multiplying the engine target rotation number ($R_r$) by the constant speed driving slip ratio $S_a$, the acceleration driving slip ratio $S_b$ or the deceleration driving slip ratio $S_c$. The result was determined as a new rotation number $R_{ta}$, $R_{tb}$ or $R_{tc}$ after tire slippage is corrected for each of the constant speed section, the acceleration section and the deceleration section.

In the engine testing apparatus of the above structure, in addition to the tire diameter, the final-drive ratio, the gear ratio, the vehicle inertia weight and the running resistance which are taken into consideration in the conventional engine testing apparatus, the slippage between the tire and the road surface is also taken into consideration and therefore, it is possible to accurately reproduce the engine rotation during actual vehicle running.

The engine rotation pattern, which is converted from the new rotation numbers $R_{ta}$, $R_{tb}$ or $R_{tc}$ and which correct for tire slippage, is not shifted from the measured engine rotation pattern. The engine testing apparatus of the present invention in which the control computer controls the rotation of the dynamometer in accordance with the engine rotation pattern converted from the new rotation numbers $R_{ta}$, $R_{tb}$ or $R_{tc}$, which correct for tire slippage, can carry out a simulation with high accuracy as compared with the conventional engine testing apparatus in which the control computer controls the rotation of the dynamometer in accordance with the engine rotation pattern converted from the target rotation number $R_r$.

Further, to achieve the above object, according to the second invention, there is provided an engine testing apparatus comprising a dynamometer connected to an output section of an engine under test, a dynamo controller for controlling the dynamometer, and an actuator for controlling a throttle opening degree of the engine under test, the dynamo controller and the actuator are controlled to adjust an output of the engine under test, wherein rotational acceleration of rotating bodies such as the engine, a transmission, a differential gear and a tire are obtained based on the target vehicle speed pattern. Each of the rotational accelerations are multiplied by an inertia moment of each of the rotation bodies to calculate a torque absorbed by each of the rotating bodies, and the engine under test is controlled such that the engine under test outputs a predetermined torque while taking these absorbed torque.

In the engine testing apparatus of the above structure, in addition to the inertia moment of the engine which is taken into consideration in the conventional engine testing apparatus, the inertia moment of other rotating bodies such as the transmission, the differential gear and the tire are also taken into consideration and therefore, it is possible to accurately reproduce the engine load during actual vehicle running, and to carry out a simulation with high accuracy.

To achieve the above object, according to the third invention, there is, provided an engine testing apparatus comprising a dynamometer connected to an output section of an engine under test to simulate an actual vehicle running on a chassis dynamo, a dynamo controller for controlling rotation of the dynamometer, and an actuator for controlling a throttle opening degree of the engine under test A driving slip ratio (y) is computed and stored as a multiple-degree equation function $y=f(T_{ff})$ using, as a variable, an output torque ($T_{ff}$) output from a torque generator and required by the engine. The engine target rotation number ($R_r$) is corrected using this value, and the rotation of the dynamometer is controlled using this corrected new rotation number.

According to another aspect of the third invention, there is provided an engine testing apparatus comprising a dynamometer connected to an output section of an engine under test to simulate an actual vehicle running on a chassis dynamo, a dynamo controller for controlling rotation of the dynamometer, and an actuator for controlling a throttle opening degree of the engine under test. Wherein a driving slip ratio (y) is computed as a multiple-degree equation function $y=f(T_{ff})$ using, as a variable, an output torque ($T_{ff}$) output from a torque generator and required by the engine, the rotation number ($R_t$) [$R_t=R_r \times (1+y)$] obtained by adding, to the engine target rotation number ($R_r$), a term obtained by multiplying the engine target rotation number ($R_r$) by the driving slip ratio (y) is determined as a new rotation number after the tire slip correction is made, and the rotation of the dynamometer is controlled by using this new rotation number.

The present inventors considered that the reason why the engine rotation pattern obtained by converting from the target vehicle speed pattern in the conventional simulation is shifted lower and higher than the engine rotation pattern measured on a chassis dynamo is related to tire slippage. From this view point, a concept of the rotation correcting ratio during the actual vehicle running, such as, the driving slip ratio (y), was introduced. This is because it is defined that the driving slip ratio (y) during the actual vehicle running is determined as function of acceleration of the vehicle, and the acceleration of this vehicle can be simulated by converting into the output torque of the engine. That is, this is because the torque supplied to the tire from the engine through the transmission and the differential gear is transmitted to the road surface and becomes a driving force which accelerates the vehicle.

Thereupon, the tire slip ratio (y) is defined by the multiple degree function $y=f(T_{ff})$ using the torque $T_{ff}$ for achieving the target output from the torque generator as variable.

The present inventors multiplied the engine target rotation number $R_f$ (simply target rotation number, hereinafter) output from the rotation generator in the simulation by the driving slip ratio (y). The obtained tire slip correction term ($R_r \times y$) is added to the target rotation number $R_r$, thereby making a new rotation number $R_t$ which is corrected for the tire slippage.

In the engine testing apparatus of the above structure, in addition to the tire diameter, the final-drive ratio, the gear ratio, the vehicle inertia weight and the running resistance which are taken into consideration in the conventional engine testing apparatus, the slip between the tire and the road surface is also taken into consideration and therefore, it is possible to accurately reproduce the engine rotation of actual running vehicle.

As shown in FIG. 2, the engine rotation pattern 40, which is converted from the new rotation number $R_t$ which is corrected for tire slippage, is not shifted from the measured engine rotation pattern, the engine testing apparatus of the present invention in which the control computer controls the rotation of the dynamometer in accordance with the engine rotation pattern converted from the new rotation number $R_t$ which is corrected for tire slippage, can carry out a simulation with high accuracy as compared with the conventional engine testing apparatus in which the control computer controls the rotation of the dynamometer in accordance with the engine rotation pattern converted from the target rotation number $R_r$.

DETAILED DESCRIPTION OF THE PREFERRED EMBODIMENTS

Figure 1:
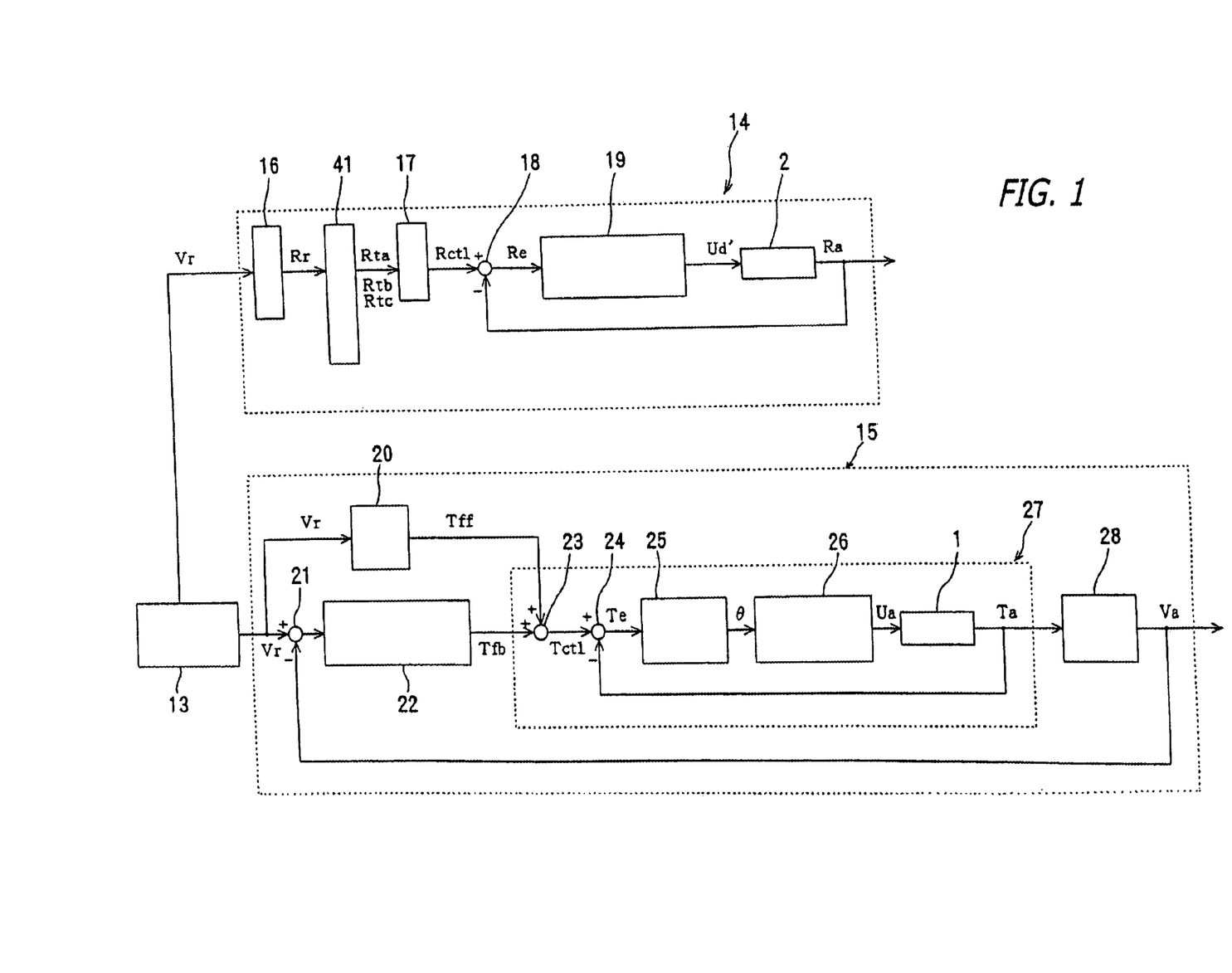
FIG. 1 shows one example of a control flow in an engine testing apparatus according to a first invention.

An embodiment of a first invention is explained with reference to the drawings. FIG. 1 shows one embodiment of the invention and shows a control flow in an engine testing apparatus shown in FIG. 3. In comparison, FIG. 2 shows, an engine rotation pattern 40 converted from a target vehicle speed pattern 12b from a simulation carried out by the engine testing apparatus of the first invention and an engine rotation pattern 31 measured when an actual vehicle is allowed to run on a chassis dynamo. In FIGS. 1 and 2, members and elements represented with the same numerals as those in FIGS. 5 and 6 are the same and thus, explanations thereof will be omitted.

As shown in FIG. 1, the control flow of the engine testing apparatus of the first invention substantially differs from FIG. 5 of the above-described conventional engine testing apparatus, wherein a new rotation number which corrects for tire slippage is divided into a constant speed section, an acceleration section and a deceleration section, and using them, a dynamometer 2 is controlled.

This will be described in greater detail using the control flow shown in FIG. 1. In FIG. 1, reference numeral 41 represents a driving slip correcting means provided between a rotation generator 16 and a delay correcting means 17.

This driving slip correcting means 41 has a computation function for adding all areas under acceleration curves $A_1$ to $A_8$ in engine rotation patterns 31 shown in FIG. 6

①A computation function for adding all areas under acceleration curves $B_1$ to $B_8$ in engine rotation patterns 30 shown in FIG. 6, a function for computing a ratio (=acceleration driving slip ratio $S_b$) of each of total areas G and R obtained by the addition, a computation function for adding all areas under deceleration curves C in the engine rotation pattern 31 shown in FIG. 6.

②A computation function for adding all areas under deceleration curves D in the engine rotation pattern 30 shown in FIG. 6, a function for computing a ratio (=deceleration driving slip ratio $S_c$) of each of total areas obtained by the addition, a computation function for adding all areas under constant speed curves E in the engine rotation pattern 31 shown in FIG. 6.

③, A computation function for adding all areas under constant speed curves F in the engine rotation pattern 30 shown in FIG. 6, a function for computing a ratio (=constant speed slip ratio $S_a$) of each of total areas obtained by the addition, and further, ④ a function for adding a term obtained by multiplying the engine target rotation number $R_r$ by the acceleration driving slip ratio $S_b$ to the target rotation number $R_r$ to compute a new rotation number $R_{tb}$ which is corrected for tire slippage, i.e., at the acceleration section, a function for computing the new rotation number $R_{tb}$ for controlling the rotation of the dynamometer 2 according to the following equation (1):

$$R_{tb}=R_r X(1+S_b) \quad (1)$$

⑤ a function for adding a term obtained by multiplying the engine target rotation number $R_r$ by the deceleration driving slip ratio $S_c$ to the target rotation number $R_r$ to compute a new rotation number $R_{tc}$ which is corrected for tire slippage, i.e., at the deceleration section, a function for computing the new rotation number $R_{tc}$ for controlling the rotation of the dynamometer 2 according to the following equation (2):

$$R_{tc}=R_r X(1+S_c) \quad (2)$$

⑥ a function for adding a term obtained by multiplying the engine target rotation number $R_r$ by the constant speed driving slip ratio $S_a$ to the target rotation number $R_r$ to compute a new rotation number $R_{ta}$ which is corrected for tire slippage, i.e., at the constant speed section, a function for computing the new rotation number $R_{ta}$ for controlling the rotation of the dynamometer 2 according to the following equation (3):

$$R_{ta}=R_r X(1+S_a) \quad (3)$$

For the control flow shown in FIG. 1, the driving slip correcting means 41 is provided between the rotation generator 16 and the delay correcting means 17. From the driving slip correcting means 41, the new target rotation number $R_{tb}$ in which the driving slippage correction (tire slippage correction) is taken into consideration can be obtained at the time of acceleration, the new target rotation number $R_{tc}$ in which the driving slip correction is taken into consideration can be obtained at the time of deceleration, and the new target rotation number $R_{ta}$ in which the driving slip correction is taken into consideration can be obtained at the time of constant speed running.

By controlling the rotation of the dynamometer 2 in accordance with the new target rotation pattern represented by the above equation (1), it is possible to accurately reproduce the engine rotation of a vehicle during use in which slippage between the tire and the road surface at the time of acceleration running is taken into consideration.

By controlling the rotation of the dynamometer 2 in accordance with the new target rotation pattern represented by the above equation (2), it is possible to accurately reproduce the engine rotation of an actual running vehicle which slippage between the tire and the road surface at the time of deceleration running is taken into consideration.

Further, by controlling the rotation of the dynamometer 2 in accordance with the new target rotation pattern represented by the above equation (3), it is possible to accurately reproduce the engine rotation during actual vehicle running in which the slippage between the tire and the road surface at the time of constant speed running is taken into consideration.

As explained above, according to the engine testing apparatus of the first invention, a new target rotation pattern is made for each of the constant speed section, the acceleration section and the deceleration section while taking the slip between the tire and the road surface into consideration, and the rotation of the dynamometer is controlled in accordance with the new target rotation pattern. Therefore, it is possible to accurately simulate the operation of an actual vehicle, and to test the performance of the engine in a state close to the actual state of operation.

Figure 7:
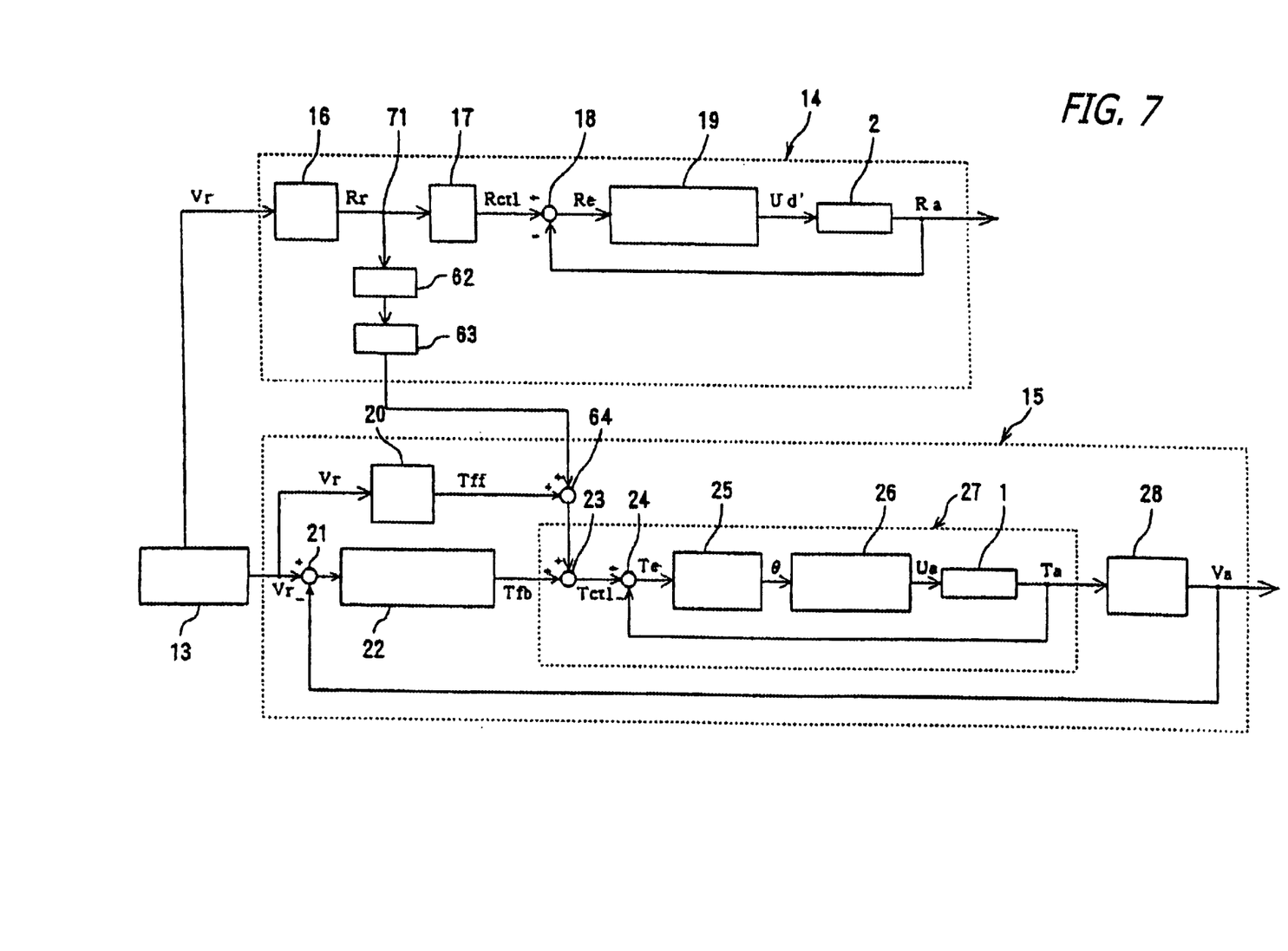
FIG. 7 shows one example of a control flow in the engine testing apparatus according to the second invention.
Figure 8:
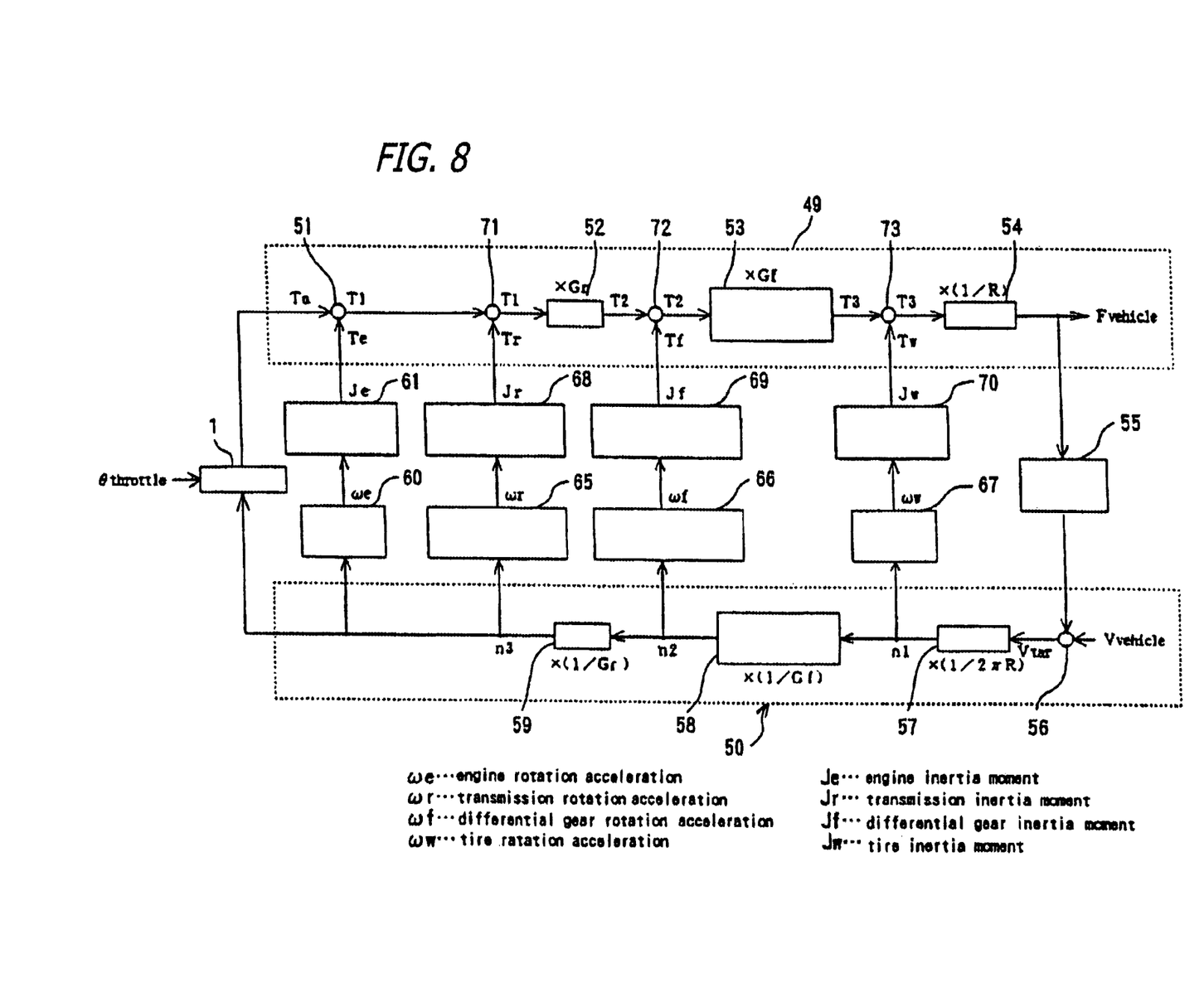
FIG. 8 shows one example of a computation flow in the engine testing apparatus according to the second invention.

An embodiment of a second invention is explained with reference to the drawings. FIGS. 7 and 8 show one embodiment of the second invention, and show one example of a control flow and a computation flow in the engine testing apparatus shown in FIG. 3. In FIGS. 7 and 8, members and elements represented with the same numerals as those in FIGS. 3, 5 and 9 are the same and thus, explanations thereof will be omitted.

As shown in FIG. 7, the control flow of the engine testing apparatus of the second invention substantially differs from the control flow of the above-described conventional engine testing apparatus show in FIG. 5, wherein a rotation control system 14 is provided, the circuit 62 for differentiating an output $V_r$ of the rotation generator 16 is provided on a branch branching at a point 71 between the rotation generator 16 and the delay correcting circuit 17, and a multiplier 63 for multiplying the output of the differentiator 62 by inertia moments of rotating bodies such as an engine, a transmission, a differential gear and a tire is provided in the rear stage of a differentiator 62 on this branch. The output from the multiplier 63 is added to an output $T_{ff}$ of the torque generator 20 of the simulation vehicle control system 15 at an addition point 64, and its added output is added to an output $T_{fb}$ of the speed feedback controller 22, and the result is determined as a control target torque $T_{ctl}$.

This is explained in greater detail using a computation flow shown in FIG. 8. In FIG. 8, the reference numerals 65, 66 and 67 represent differentiators. That is, the differentiator 65 differentiates the engine rotation angle speed n3 output from the multiplier 59 to output a transmission rotation acceleration $\omega_r$. The differentiator 66 differentiates a rotation angle speed n2 closer to an entrance of the differential gear output from the multiplier 58 to output a differential gear rotation acceleration $\omega_f$. The differentiator 67 differentiates a rotation angle speed n1 of the tire to output a tire rotation acceleration $\omega_w$.

Multipliers 68, 69 and 70 for multiplying outputs from the differentiators 65, 66 and 67 by the predetermined multiplier are provided closer to output side of these differentiators 65, 66 and 67. That is, the multiplier 68 multiples the transmission rotation acceleration $\omega_r$ by a transmission inertia moment $J_r$, and outputs a torque $T_r$ absorbed by the transmission to a butt point 71 provided immediately in front of the multiplier 52 of the torque computation system 49. The multiplier 69 multiplies the differential gear rotation acceleration $\omega_f$ by a differential gear inertia moment $J_r$, and outputs a torque $T_f$ absorbed by the differential gear to a butt point 72 provided immediately in front of the multiplier 53 of the torque computation system 49. The multiplier 70 multiplies the tire rotation acceleration $\omega_w$ by a tire inertia moment $J_w$, and outputs a torque $T_w$ absorbed by the tire to a butt point 73 provided immediately in front of the multiplier 54 of the torque computation system 49.

In the engine testing apparatus of the above structure, as shown in the flowchart of FIG. 8, at a butt point 51, an actual torque. $T_a$ of the engine 1 under test is butted against a torque value $T_E$ resulting from the inertia moment of the engine 1 under test. A torque value T1 (=$T_a - T_E$) is outputted from the butt point 51. In the butt point 71, the torque value T1 is butted against a torque value $T_r$ resulting from inertial moment of the transmission, and a torque value T1' (=T1−$T_r$) is outputted from the butt point 71. The torque value T1' is multiplied by a gear change ratio $G_r$ in the multiplier 52, and a torque value T2 is output.

At the butt point 72, the torque value T2 is butted against a torque value $T_f$ resulting from differential gear, and a torque value T2' (=T2−$T_f$) is outputted from the butt point 72. The torque value T2' is multiplied by a differential gear ratio $G_f$ in the multiplier 53, and a torque value T3 is outputted. Further, at the butt point 73, the torque value T3 is butted against a torque value $T_w$ resulting from the tire, and a torque value T3' (=T3−$T_w$) is outputted from the butt point 73. The torque value T3' is multiplied by a multiplier (1/R) concerning the tire diameter R in the multiplier 54, and a driving force $F_{vehicle}$ at the tire surface is obtained.

As described above, in the engine testing apparatus of the above embodiment, in addition to the inertia moment of the engine which is taken into consideration in the conventional engine testing apparatus, torque resulting from the inertia moment of other rotating bodies such as the transmission, the differential gear and the tire are also computed. The torque is taken into consideration such that the engine under test outputs the predetermined torque and therefore, it is us possible to accurately reproduce the engine load during actual vehicle running and to carry out a simulation with high accuracy.

Although tire slippage is not taken into consideration in the above embodiment, it may be taken into consideration. In this case, in the control flow shown in FIG. 7, a tire slippage correcting circuit may be provided between the point 71 and the delay correcting circuit 17, and an output $T_{ff}$ of the torque generator 20 may be inputted to the tire slip correcting circuit. In this case, the simulation can be carried out with higher accuracy.

As explained above, according to the engine testing apparatus of the second invention, since the output of the engine under test is controlled while taking the inertia moment of each of rotating bodies such as the engine into consideration, it is possible to accurately simulate the running of an actual vehicle and to test the performance of the engine in a state close to the actual state.

Figure 10:
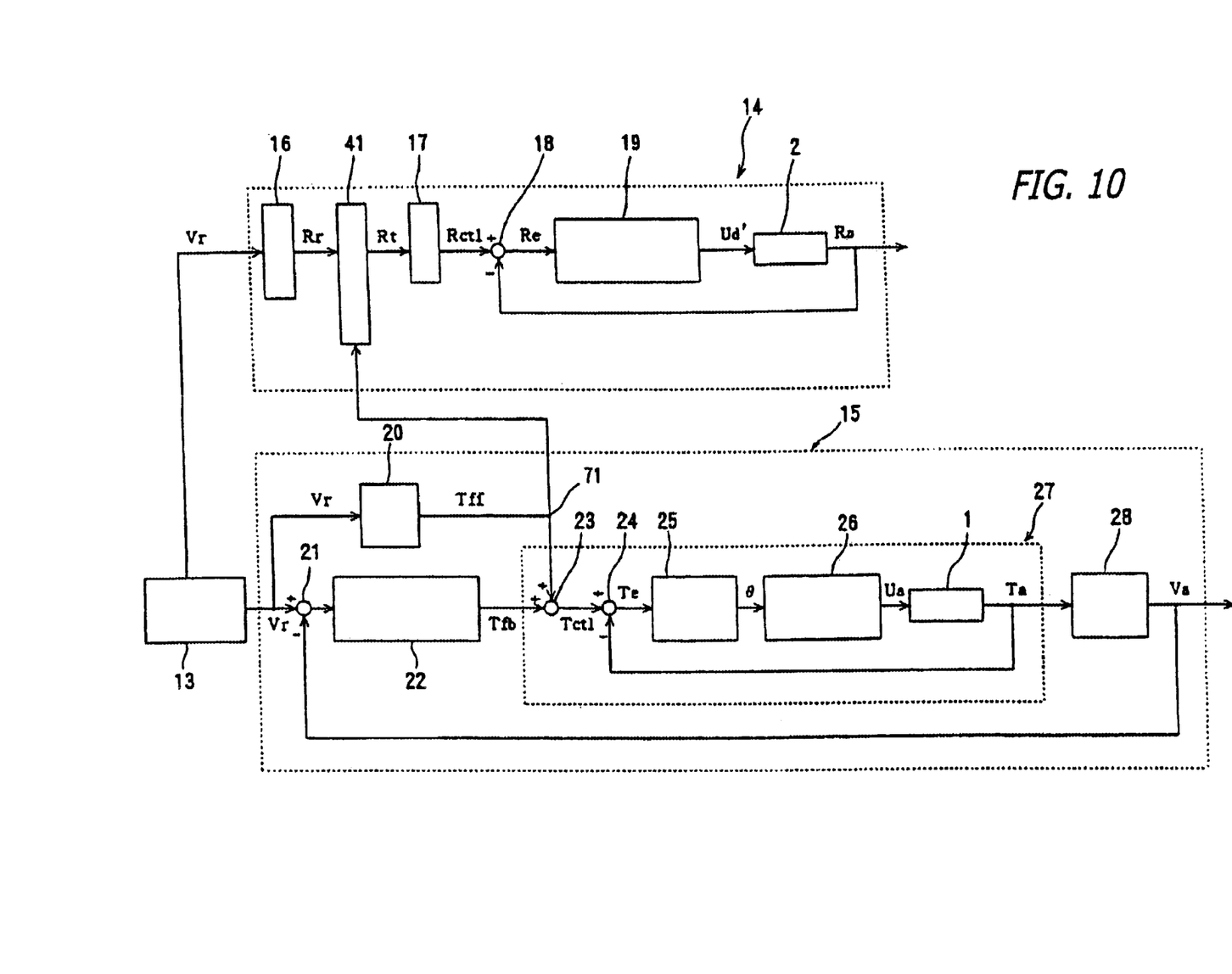
FIG. 10 shows one example of a control flow in the engine testing apparatus according to the third invention.

An embodiment of a third invention is explained with reference to the drawings. FIG. 10 shows one embodiment of the third invention and shows one example of a control flow in the engine testing apparatus shown in FIG. 3. By comparison, FIG. 2 shows, the engine rotation pattern 40, which, is converted from the target vehicle speed pattern 12b in a simulation carried out by the engine testing apparatus of the third invention and the engine rotation pattern 31 measured when the actual vehicle is allowed to run on the chassis dynamo. In FIGS. 10 and 2, members and elements represented with the same numerals as those in FIGS. 5 and 6 are the same and thus, explanations thereof will be omitted.

Referring to FIG. 10 the control flow of the engine testing apparatus of the third invention substantially differs from the control flow of the above-described conventional engine testing apparatus of FIG. 5 in that the dynamometer 2 is controlled using a new rotation number $R_t$ which is corrected for tire slippage.

This is explained in more detail using a control flow shown in FIG.10. In FIG. 10, the reference numeral 41 represents tire slippage correcting means provided between a rotation generator 16 and the delay correcting means 17.

The tire slippage correcting means 41 has a function for computing a driving slip ratio (y) from the torque $T_{ff}$ using multiple-degree equation function y=f($T_{ff}$), a computation function for multiplying the target rotation number $R_r$ output from the rotation generator 16 by the driving slip ratio (y), and a function for adding the obtained tire slippage correcting term ($R_r$ X y) to the target rotation number $R_r$ to compute a new rotation number $R_t$ for controlling the rotation of the dynamometer 2 according to the following equation (1):

$$R_t = R_r X (1+y) \tag{1}$$

That is, the driving slip ratio (y) is defined as a multiple-degree equation function y=f($T_{ff}$) using the outputted torque ($T_{ff}$) output from the torque generator 20 and required by the engine. The torque ($T_{ff}$) is formed into a pattern as a known value. Thus, the driving slip ratio (y) can also be formed into a pattern.

Further, the target rotation number $R_r$ of the dynamometer 2 is also formed into a pattern as a known value, the tire slip correcting term ($R_r$ X y) can by obtained by multiplying the target rotation number $R_r$ by the driving slip ratio (y).

For example, the following equations (2) and (3) can be employed as the multiple-degree equation function y=f ($T_{ff}$):

(i) when y is closer to a first degree equation, $$y = f(T_{ff}) = AXT_{ff} + B \tag{2}$$

(ii) when y is closer to a second degree equation, $$Y=f(T_{ff})=A((T_{ff})^2+BXT_{ff}+C \quad (3)$$

(wherein A, B and C are constants).

In case (i), it is possible to accurately reproduce the engine rotation number of the actual running vehicle in which slippage between the tire and the road surface is taken into consideration by controlling the rotation of the dynamometer 2 in accordance with a new target rotation pattern represented by the following equation (4):

$$R_t=R_rX[1+(AXT_{ff}+B)] \quad (4)$$

by substituting equation (2) into equation (1).

In the case of the (ii), the rotation of the dynamometer 2 is controlled in accordance with a new target rotation pattern represented by the following equation (5):

$$R_t=R_rX[1+(A(T_{ff})^2+BXT_{ff}+C)] \quad (5)$$

by substituting equation (3) into equation (1).

In this manner, in the control flow shown in FIG. 10, the tire slippage correcting means 41 is provided between the point 81 and the delay correcting circuit 17, the output $T_{ff}$ of the torque generator 20 is inputted to the tire slippage correcting means 41, and the new target rotation number $R_r$ in which the tire slippage correction is taken into consideration can be obtained, and the rotation of the dynamometer 2 is controlled in accordance with the target rotation number $R_t$. Therefore, it is possible to accurately reproduce the engine load during actual vehicle running and to carry out a simulation with high accuracy.

As explained above, according to the engine testing apparatus of the third invention, a new target rotation pattern is made while taking slippage between the tire and the road surface into consideration, and the rotation of the dynamometer is controlled in accordance with the new target rotation pattern. Therefore, it is possible to accurately simulate the actual running vehicle, and to test the performance of the engine in a state close to the actual state during operation.

What is claimed is:

1. An engine testing apparatus comprising:
   a dynamometer connected to an output section of an engine under test which is to be tested to simulate an actual vehicle running on a chassis dynamo;
   a dynamo controller for controlling rotation of the dynamometer;
   an actuator for controlling a throttle opening degree of the engine under test; and
   a computer in communication with the dynamo controller and the actuator and capable of controlling the dynamo controller and the actuator to adjust an output of the engine under test, the computer configured to compute and store a constant speed driving slip ratio ($S_a$) in a constant speed running state in a target vehicle speed pattern, an acceleration driving slip ratio ($S_b$) in an acceleration running state, and a deceleration driving slip ratio ($S_c$) in a deceleration running state;
   wherein the computer is capable of obtaining an engine target rotation number ($R_r$) by converting the target vehicle speed pattern by values of the driving slip ratios ($S_a$), ($S_b$) and ($S_c$) and corrects the engine rotation number ($R_r$) for each of the running states thereby resulting in a new engine target rotation number to be used at the time of simulation and controls the rotation of the dynamometer and corrects for tire slippage.

2. An engine testing apparatus comprising:
   a dynamometer connected to an output section of an engine under test which is to be tested to simulate an actual vehicle running on a chassis dynamo;
   a dynamo controller for controlling rotation of the dynamometer;
   an actuator for controlling a throttle opening degree of the engine under test; and
   a computer in communication with the dynamo controller and the actuator and capable of controlling the dynamo controller and the actuator to adjust an output of the engine under test, the computer configured to compute and store a constant speed driving slip ratio ($S_a$) in a constant speed running state in a target vehicle speed pattern, an acceleration driving slip ratio ($S_b$) in an acceleration running state, and a deceleration driving slip ratio ($S_c$) in a deceleration running state;
   wherein the computer is capable of obtaining a rotation number ($R_{ta}$){[$R_{ta}=R_rX(1+S_a)$], ($R_{tb}$) [$R_{tb}=R_rX(1+S_b)$] or ($R_{tc}$)[$R_{tc}=R_rX(1+S_c)$]} by adding to the engine target rotation number ($R_r$) a term obtained by multiplying the engine target rotation number ($R_r$) by the constant speed driving slip ratio ($S_a$), the acceleration driving slip ratio ($S_b$) or the deceleration driving slippage ratio ($S_c$), thereby determining a new rotation number subjected to a tire slip correction to be used at the time of simulation, thereby controlling the rotation of the dynamometer and correcting for tire slippage.

3. An engine testing apparatus comprising:
   a dynamometer connected to an output section of an engine under test which is to be tested;
   a dynamo controller for controlling the dynamometer;
   an actuator for controlling a throttle opening degree of the engine under test; and
   a computer in communication with the dynamo controller and the actuator and capable of controlling the dynamo controller and the actuator to adjust an output of the engine under test, the computer configured to calculate rotation acceleration an engine, a transmission, a differential gear and a tire based on a target vehicle speed pattern, and wherein the computer configured to multiply each of the rotating accelerations by an inertia moment of each of the engine, the transmission, the differential gear and the tire to calculate a torque absorbed by each;
   wherein the computer adjusts the engine under test to output a predetermined torque while measuring an absorbed torque.

4. An engine testing apparatus comprising:
   a dynamometer connected to an output section of an engine under test which is to be tested used to simulate an actual vehicle running on a chassis dynamo;
   a dynamo controller for controlling rotation of the dynamometer;
   an actuator for controlling a throttle opening degree of the engine under test; and
   a computer configured to compute and store a driving slip ratio (y) as a multiple-degree equation function $y=f(T_{ff})$ using, as a variable, an output torque ($T_{ff}$) outputted from a torque generator and required by the engine, wherein an engine target rotation number ($R_r$) is corrected using the driving slip ratio and the rotation of the dynamometer is controlled using the corrected rotation number.

5. An engine testing apparatus comprising:

a dynamometer connected to an output section of an engine under test which is to be tested used to simulate an actual vehicle running on a chassis dynamo;

a dynamo controller for controlling rotation of the dynamometer;

an actuator for controlling a throttle opening degree of the engine under test; and a computer configured to compute and store a driving slip ratio (y) as a multiple-degree equation function $y=f(T_{ff})$ using, as a variable, an output torque $(T_{ff})$ outputted from a torque generator and required by the engine;

wherein a rotation number $(R_t)[R_t=R_r X (1+y)]$ is obtained by adding, to an engine target rotation number $(R_r)$ a term obtained by multiplying an engine target rotation number $(R_r)$ by the driving slip ratio (y) determined as a new rotation number after the tire slip correction is made, and the rotation of the dynamometer is controlled by using the new rotation number.

6. A method of testing the performance of an engine, comprising:

attaching an engine testing apparatus to an engine;

storing on a computer attached to said engine test apparatus a constant speed driving slip ratio $(S_a)$ in a constant speed running state in a target vehicle speed pattern, an acceleration driving slip ratio $(S_b)$ in an acceleration running state, and a deceleration driving slip ratio $(S_c)$ in a deceleration running state;

obtaining an engine target rotation number $(R_r)$ by converting the target vehicle speed pattern by values of the driving slip ratios $(S_a)$, $(S_b)$ and $(S_c)$;

correcting the engine rotation number $(R_r)$ for each of the running states; and controlling the rotation of the dynamometer with the corrected engine rotation number.

7. A method of testing the performance of an engine, comprising:

attaching an engine testing apparatus to an engine;

storing on a computer attached to said engine test apparatus a constant speed driving slip ratio $(S_a)$ in a constant speed running state in a target vehicle speed pattern, an acceleration driving slip ratio $(S_b)$ in an acceleration running state, and a deceleration driving slip ratio $(S_c)$ in a deceleration running state;

calculating at least one rotation number $(R_{ta})\{[R_{ta}=R_r X (1+S_a)]$, $(R_{tb})[R_{tb}=R_r X(1+S_b)]$ and $(R_{tc})[R_{tc}=R_r X(1+S_c)]\}$ by adding to an engine target rotation number $(R_r)$ a term obtained by multiplying the engine target rotation number $(R_r)$ by at least one of the constant speed driving slip ratio $(S_a)$, the acceleration driving slip ratio $(S_b)$ and the deceleration driving slippage ratio $(S_c)$;

determining a new rotation number subjected to a tire slip correction; and using the corrected rotation number at the time of simulation, thereby controlling the rotation of the dynamometer.

8. A method of testing the performance of an engine, comprising:

attaching an engine testing apparatus to an engine;

obtaining a rotation acceleration of an engine, a transmission, a differential gear and a tire based on the target vehicle speed pattern;

storing the rotation acceleration on a computer attached to said engine test apparatus;

multiplying by an inertia moment of each of the engine, the transmission, the differential gear and the tire;

calculating a torque absorbed by each of the engine, the transmission, the differential gear and the tire; and adjusting the engine under test to output a predetermined torque while measuring an absorbed torque.

9. A method of testing the performance of an engine, comprising:

attaching an engine testing apparatus to an engine;

computing and storing a driving slip ratio (y) as a multiple-degree equation function $y=f(T_{ff})$ using, as a variable, an output torque $(T_{ff})$ outputted from a torque generator and required by the engine;

correcting an engine target rotation number $(R_r)$ using the driving slip ratio; and controlling the rotation of the dynamometer using the corrected rotation number.

10. A method of testing the performance of an engine, comprising:

attaching an engine testing apparatus to an engine;

computing and storing a driving slip ratio (y) as a multiple-degree equation function $y=f(T_{ff})$ using, as a variable, an output torque $(T_{ff})$ outputted from a torque generator and required by the engine;

obtaining a rotation number $(R_t)[R_t=R_r X(1+y)]$ by adding, to an engine target rotation number $(R_r)$, a term obtained by multiplying an engine target rotation number $(R_r)$ by the driving slip ratio (y); and controlling the rotation of the dynamometer using the new rotation number.

* * * * *